No. 758,303. PATENTED APR. 26, 1904.
E. ECKMANN.
ELECTRIC HEATER.
APPLICATION FILED AUG. 15, 1902.
NO MODEL.

Witnesses:

Inventor:
Ernst Eckmann

No. 758,303. Patented April 26, 1904.

UNITED STATES PATENT OFFICE.

ERNST ECKMANN, OF BERLIN, GERMANY, ASSIGNOR TO MARTIN PETERSEN, OF FRIEDRICHSGABEKOOG, SCHLESWIG-HOLSTEIN, GERMANY.

ELECTRIC HEATER.

SPECIFICATION forming part of Letters Patent No. 758,303, dated April 26, 1904.

Application filed August 15, 1902. Serial No. 119,718. (No model.)

*To all whom it may concern:*

Be it known that I, ERNST ECKMANN, engineer, a citizen of the Kingdom of Prussia, and a resident of Berlin, Germany, (whose post-office address is Steglitzerstrasse 40,) have invented certain new and useful Improvements in Electric Heaters, of which the following is a specification.

This invention relates to an improved electric heater consisting of a frame carrying the wires heated to incandescence by an electric current and so disposed that an air-current supplied by a fan is caused to pass over said heated wires, and thus become heated by cooling the wires. The electric current utilized for heating the wires also drives the electromotor. Upon the motor-shaft is mounted a suction-fan that induces the air-current and draws air through the parts of the electric motor where the same becomes already slightly heated, while effectually keeping the motor cool. If the suction-fan is arranged for suction from both sides, it may advantageously be caused to draw air and refrigerate the motor from one side, as previously stated, while on the other side the resistance connected in front of the motor is disposed in the suction-channel.

The invention will be more readily understood with reference to the accompanying drawings, in which—

Figure 1:
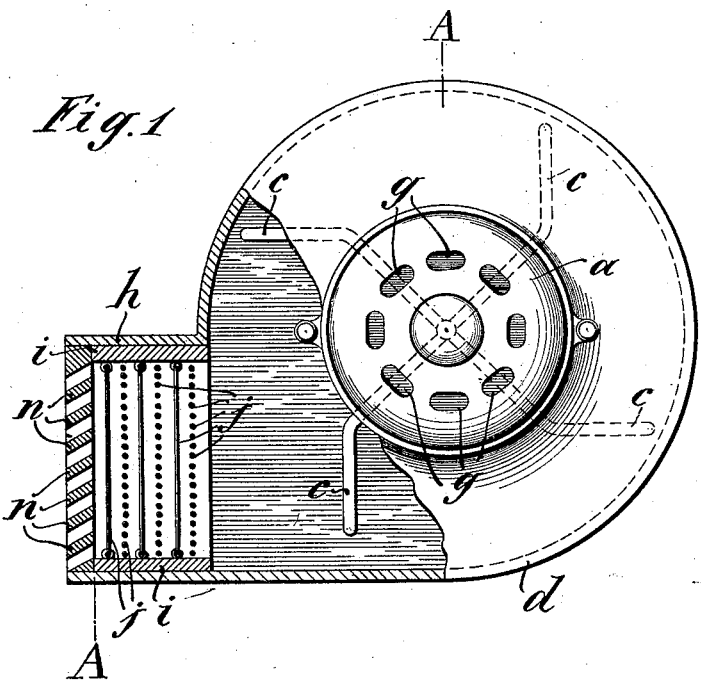
Figure 2:
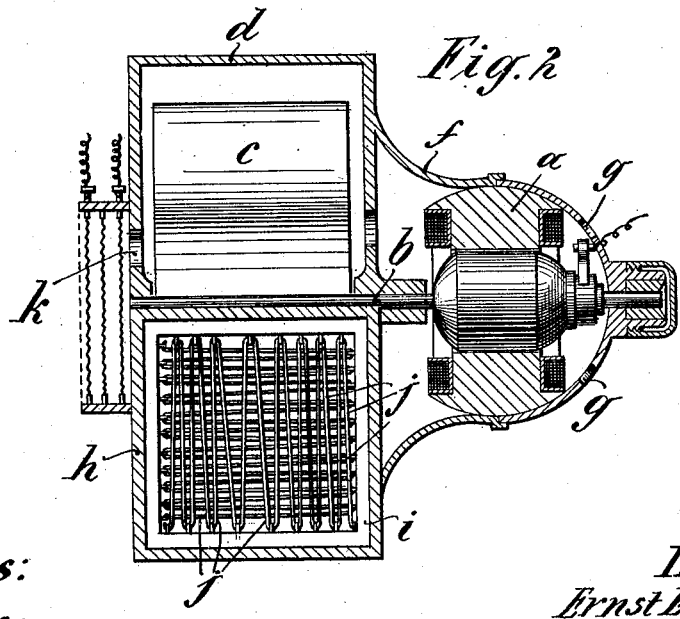

Figures 1 and 2 are a sectional side elevation and a plan, respectively, of an apparatus embodying the invention shown by way of an example.

$a$ is the electromotor, on the prolonged shaft $b$ of which is mounted a fan-wheel $c$, arranged to rotate within a suction-casing $d$. The blades of said fan-wheel $c$ are advantageously curved in the rearward direction. The casing $f$, inclosing the electric motor $a$, is integral with the exhauster-casing $d$ and is formed with orifices $g$ for the entrance of air to the armature. In the delivery or discharge pipe $h$ of the suction-fan are mounted frames $i$, on which are stretched wire $j$ having high specific resistance, so that by the passage of the electric current they become heated to incandescence. I find it advantageous to so mount the said frames $i$ in the interior of the delivery-pipe as to dispose the wires in the successive frames at right angles to each other.

It may not always be convenient in a large apparatus of this kind to pass the entire volume of air moved by the fan through the electric motor, and in such case the other side wall of the suction-fan is provided with a central aperture $k$, and the air thus entering may then be slightly heated by disposing in said aperture one or more frames carrying resistance-wires which are electrically connected in front of the motor.

The air when drawn in will at once be warmed before entering the suction-fan and at leaving the latter becomes strongly heated by passing between and around the incandescent wires $j$ at the delivery end and is then discharged into the room for heating the same.

The hot-air current should be directed toward and delivered near the floor into the room to be heated. This may be effected either by directing the delivery end of the pipe $h$ downward or by obturating the delivery end of such pipe by means of downwardly-deflecting boards or strips $n$, similar to those adopted for Venetian blinds or ventilators. These latter also serve the purpose of preventing short-circuiting, intentional or otherwise, by the insertion of foreign bodies or substances.

The entire apparatus may be placed in the interior of a casing of any suitable form. For example, it may present the appearance of a stove.

Having now particularly described and ascertained the nature of my said invention and in what manner the same is to be performed, I declare that what I claim is—

1. In combination, a cylindrical casing having an opening in the side and having a tangential opening, a fan rotating in said cylinder an electric motor driving said fan, and electric conducting-wires in said openings, substantially as described.

2. In combination, a cylindrical casing having an opening in one side and an integral projecting motor-casing on the other, a fan in said cylinder, a shaft carrying said fan and extending through said projecting motor-casing, said casing having openings leading to the outside air and to the interior of the cylinder, an electric motor in said casing, said cylinder having a tangential delivery-opening, and electric conducting-wires in said side and delivery openings, substantially as described.

In testimony whereof I affix my signature in presence of two witnesses.

ERNST ECKMANN.

Witnesses:
WOLDEMAR HAUPT,
HENRY HASPER.